United States Patent Office 3,637,771
Patented Jan. 25, 1972

3,637,771
7α-METHYL-Δ⁴,⁹-GONADIENES
Lucien Nedelec, Clichy-sous-Bois, and Jean-Claude Gasc, Bondy, France, assignors to Roussel-UCLAF, Paris, France
No Drawing. Continuation-in-part of application Ser. No. 602,112, Nov. 29, 1966. This application July 7, 1969, Ser. No. 839,711
Claims priority, application France, Dec. 2, 1965, 40,659
Int. Cl. C07c 169/20, 169/22
U.S. Cl. 260—397.4
5 Claims

ABSTRACT OF THE DISCLOSURE

7α-methyl-13β-alkyl-Δ⁴,⁹-gonadienes of the formula

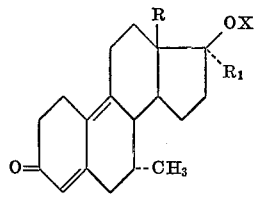

wherein R is an alkyl of 1 to 4 carbon atoms, R₁ is selected from the group consisting of hydrogen and saturated and unsaturated hydrocarbon which may be substituted and X is selected from the group consisting of hydrogen, acyl of an organic carboxylic acid of 1 to 18 carbon atoms, acyl of a substituted carbonic acid of 1 to 18 carbon atoms and aliphatic, 5 to 6 member cyclic and heterocyclic hydrocarbons which may be substituted and to novel processes for their preparation. The invention also relates to novel anabolic and/or androgenic compositions having reduced or no estrogenic activity.

PRIOR APPLICATION

This application is a continuation-in-part application of our copending, commonly assigned U.S. patent application Ser. No. 602,112 filed Nov. 29, 1966, now abandoned.

STATE OF THE ART

Generally, Δ⁴,⁹-gonadiene-3-ones have a very noticeable estrogenic activity and therefore a balance exists between their anabolic and/or androgenic activity and the estrogenic activity which leads to a noticeable reduction of their biological activity. The 7α-methyl-Δ⁴,⁹-gonadiene-3-ones of Formula I which do not have any substantial estrogenic activity have an androgenic activity or pure anabolic activity of far greater intensity.

OBJECTS OF THE INVENTION

It is an object of the invention to provide novel 7α-methyl-Δ⁴,⁹-gonadiene-3-ones of Formula I.

It is another object of the invention to provide novel intermediates for the 7α-methyl-Δ⁴,⁹-gonadiene-3-ones of Formula I.

It is a further object of the invention to provide a novel process for the preparation of the 7α-methyl-Δ⁴,⁹-gonadiene-3-ones of Formula I.

It is an additional object of the invention to provide novel therapeutic compositions having androgenic and/or anabolic activity.

It is another object of the invention to provide a novel method of producing anabolic and/or androgenic effects in warm-blooded animals.

These and other objects and advantages of the invention will become obvious from the following detailed description.

THE INVENTION

The novel 7α-methyl-Δ⁴,⁹-gonadiene-3-ones of the invention have the formula

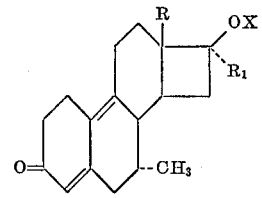

wherein R is an alkyl of 1 to 4 carbon atoms, R₁ is selected from the group consisting of hydrogen and saturated and unsaturated hydrocarbon which may be substituted and X is selected from the group consisting of hydrogen, acyl of an organic carboxylic acid of 1 to 18 carbon atoms and aliphatic, to 5 to 6 membered and cyclic and heterocyclic hydrocarbons, which may be substituted and acyl of a substituted carbonic acid of 1 to 18 carbon atoms.

The 7α-methyl-Δ⁴,⁹-gonadiene-3-ones of Formula I possess outstanding hormonal properties, particularly androgenic and/or anabolic activity with reduced or no estrogenic activity. For example, 7α-methyl-17β-acetoxy-Δ⁴,⁹-estradiene-3-one, 7α,17α-dimethyl-Δ⁴,⁹-estradiene-17β-ol-3-one exhibit very intense anabolic and androgenic activity, considerably superior to known compounds with androgenic and anabolic activity. 7α-methyl-17β-acetoxy-Δ⁴,⁹-estradiene-3-one shows its pharmacological activity in warm-blooded animals at the daily dose of 1 γ/kg. Also, 7α - methyl-17α-ethynyl-Δ⁴,⁹-estradiene-17β-ol-3-one has a very distinct anabolic activity when administered orally as well as progestomimetic activity and antizygotic activity while being practically devoid of any estrogenic activity.

The addition of the 7α-methyl-radical to the molecule of 13β-R-17α-R₁-17β-OX-Δ⁴,⁹-gonadiene - 3 - ones substantially modifies the physiological activity of the basic molecule by modifying the intensity of the said activity and reducing or eliminating the estrogenic activity of the basic molecule depending upon the substituent in the 17α-position.

A preferred group of 7α-methyl-Δ⁴,⁹-gonadienes of Formula I are those compounds in which R₁ is selected from the group consisting of lower alkyl, lower alkenyl and lower alkynyl and X is selected from the group consisting of hydrogen, lower alkyl, lower alkenyl, lower alkoxy alkyl, acyl of an organic carboxylic acid of 1 to 18 carbon atoms and the carbonates thereof and 5 to 6 member heterocyclics. The term "lower" is intended to mean 1 to 7 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecyl acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid, heterocyclic carboxylic acids, such as furane-2-carboxylic acid, 5-tetbutylfurane-2-carboxylic acid, 5-bromofurane -2-carboxylic acid and nicotinic acids; β-ketoalkanoic acids, such as acetylacetic acid, propionylacetic acid and butyrylacetic acid; amino acids, such as diethylaminoacetic acid and aspartic acid.

Examples of specific 7α-methyl-$\Delta^{4,9}$-gonadiene-3-ones of Formula I are 7α-methyl-$\Delta^{4,9}$-estradiene-17β-ol-3-one and its hexahydrobenzyl carbonate; 7α-methyl-17β-allyloxy-$\Delta^{4,9}$-estradiene-3-one; 7α,17α - dimethyl - 17β - methoxymethoxy-$\Delta^{4,9}$-estradiene-3-one; 7α - methyl - 13β - ethyl-17β - acetoxy - $\Delta^{4,9}$ - gonadiene - 3 - one; 7α,17α-dimethyl-17β - tetrahydropyranyloxy-$\Delta^{4,9}$-estradiene - 3 - one; 7α-methyl - 17α - vinyl - $\Delta^{4,9}$-estradiene-17β-ol-3-one; 7α-methyl - 17α(1' - propynyl)-$\Delta^{4,9}$-estradiene - 17β-ol-3-one; 7α - methyl - 17β - acetoxy - $\Delta^{4,9}$-estradiene-3-one; 7α-methyl - 17α-ethynyl-$\Delta^{4,9}$-estradiene-17β-ol-3-one; 7α,17α-dimethyl-$\Delta^{4,9}$-estradiene-17β-ol-3-one, etc.

The novel process of the invention for the preparation of the 7α-methyl-$\Delta^{4,9}$-gonadiene-3-ones of Formula I comprises subjecting a 3 - ketal - 7α - methyl - 13β-R-$\Delta^{5(10),9(11)}$-gonadiene-17-one wherein R is an alkyl of 1 to 4 carbon atoms to the action of a reducing agent to form the corresponding 3-ketal-7α-methyl-13β-R-17α-$R_1$-$\Delta^{5(10),9(11)}$-gonadiene-17β-ol wherein $R_1$ has the above definition and subjecting the latter to the action of a strong mineral acid to form the corresponding 7α-methyl-13β-R-17α-$R_1$-$\Delta^{4,9}$-gonadiene-17β-ol-3-one which may be reacted with an etherification agent or an esterification agent to form the 17β-ether of 17β-ester thereof. The reaction scheme is illustrated on Table I.

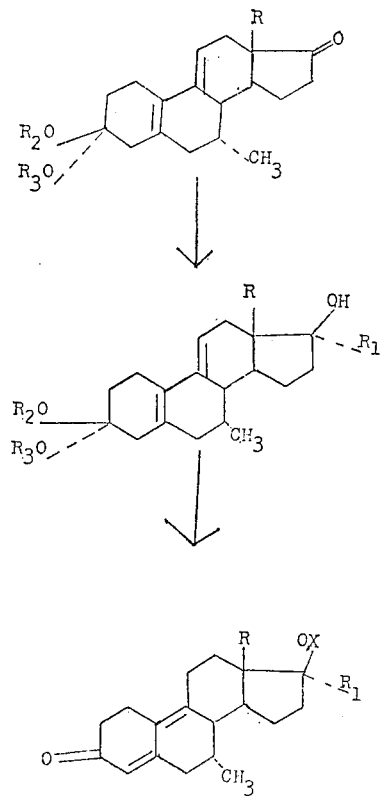

wherein R, $R_1$ and X have the above definitions and $R_2$ and $R_3$ are lower alkyl and taken together form a lower alkylene.

Examples of suitable reducing agents for the process are mixed alkali metal hydrides such as sodium borohydride, trimethoxy sodium borohydride, tri-tert-butoxy lithium aluminum hydride, etc. and organo-metallic compounds such as alkyl magnesium halides, i.e., methyl magnesium bromide and iodide; alkenyl magnesium halides and alkenyl zinc halides, i.e., vinyl magnesium bromide, allyl magnesium bromide; alkynyl zinc halides and alkynyl magnesium halides, i.e., ethynyl magnesium bromide, propynyl magnesium bromide, propynyl zinc bromide; and alkali metal acetylides, i.e., potassium acetylide.

Examples of suitable strong mineral acids for the deketalization step are perchloric acid, hydrochloric acid, sulfuric acid, etc.

Examples of suitable etherification agents are hydrocarbon halides such as methoxychloromethane, benzyloxy chloromethane, methyl iodide, and ethylenic derivatives such as dihydropyran.

Examples of suitable esterifying agents are the acid anhydrides and acid chlorides of organic carboxylic acids of 1 to 18 carbon atoms and carbonic acid halides such as hexahydrobenzyl chloroformate.

A modification of the process of the invention comprises reacting a 3 - ketal - 7α - methyl - 13β-R-17α-$R_1$-$\Delta^{5(10),9(11)}$-gonadiene-17β-ol with an alkenyl halide such as allyl bromide in the presence of an acid acceptor to form the corresponding 3-ketal-7α-methyl-13β-R-17β-alkenyloxy-17α-$R_1$-$\Delta^{5(10),9(11)}$-gonadiene and reacting the latter with a strong mineral acid to form the corresponding 7α - methyl - 13β-R-17β-alkenyloxy-17α-$R_1$-$\Delta^{4,9}$-gonadiene-3-one.

The novel androgenic and/or anabolic compositions of the invention are comprised of at least one 7α-methyl-$\Delta^{4,9}$-gonadiene-3-ones of Formula I and a pharmaceutical carrier. The compositions may be in the form of injectable or drinkable solutions or suspensions, put up in ampules or multiple dose flacons, in the form of implants, tablets, coated tablets, sublingual tablets and suppositories.

The novel method of the invention of producing androgenic and/or anabolic effects in warm-blooded animals comprises administering to warm-blooded animals an effective amount of at least one 7α-methyl-$\Delta^{4,9}$-gonadiene-3-ones of Formula I. The said compounds may be administered orally, perlingually, trancutaneously or rectally. The usual useful daily dose is 0.0015 to 0.08 mg./kg. in the adult depending upon the method of administration.

The compositions of the invention may be used for the treatment of disorders in proteinic anabolism, of asthenia, thinness, osteoporosis, andropause, senescence, delayed consolidation of fractures, metabolic ailments due to prolonged corticotheraphy, genital adiposis syndrome, functional meno-metrorrhagia, fibroma, endometriosis.

The 3-ketal-7α-methyl-13β-R-$\Delta^{5(10),9(11)}$-gonadiene-17-ones used as the starting material in the process may be formed from a des-A-gonene of the formula

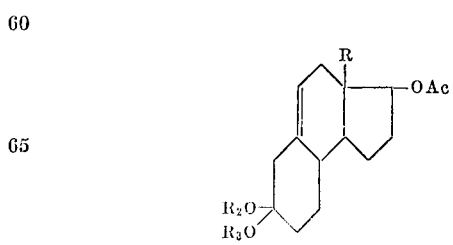

(formed by ketalization of the des-A-gonenes of U.S. Pat. No. 3,115,507) by a process analogous to that in commonly assigned, copending U.S. patent application Ser. No.

576,240, filed Aug. 31, 1966. The reaction scheme is illustrated in Table II.

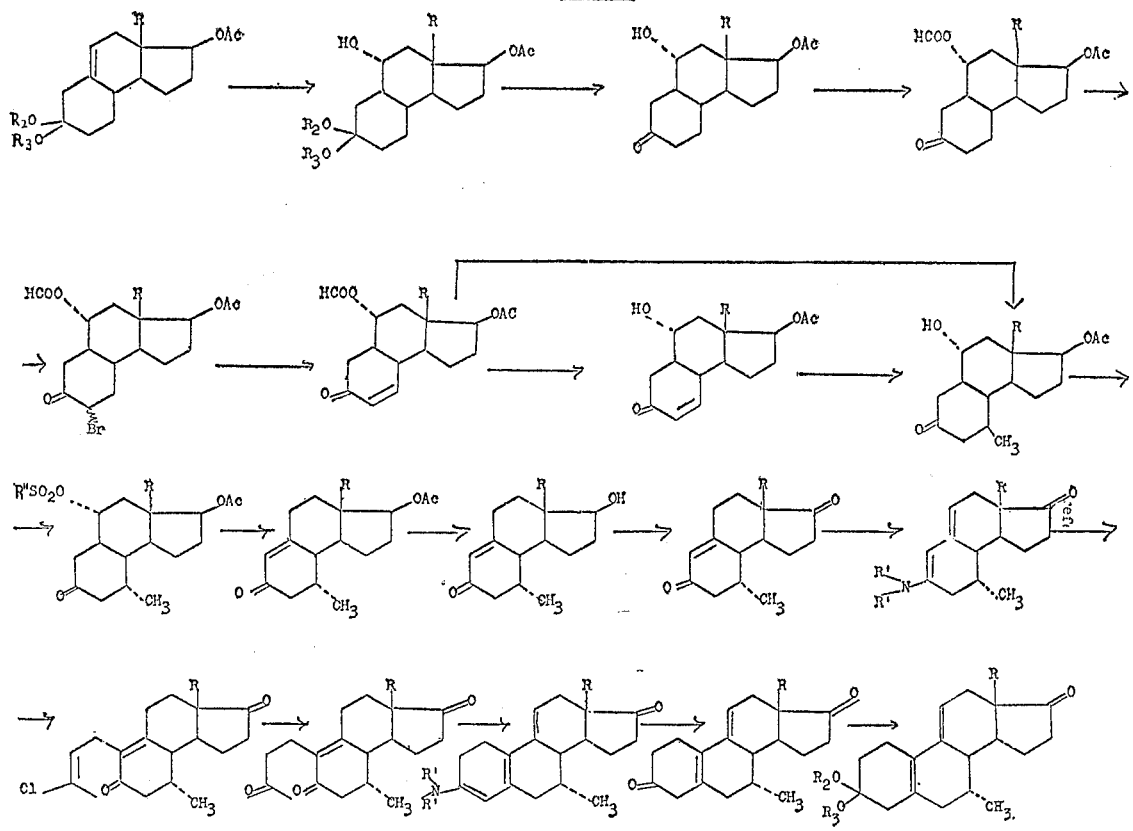

wherein R, $R_2$ and $R_3$ have the above definitions, Ac is an acyl radical of an organic carboxylic acid of 1 to 18 carbon atoms, R″ is an organic radical and the R's are lower alkyl or together with the nitrogen to which they are attached form a 5 to 6 member heterocyclic ring.

In the following examples there are described several preferred embodiments to illustrate the invention. However, it should be understood that the invention is not intended to be limited to the specific embodiments.

EXAMPLE I

Preparation of 7α-methyl-17β-acetoxy-Δ$^{4,9}$-estradiene-3-one

Step A: Preparation of 3,3-dimethoxy-7α-methyl-Δ$^{5(10), 9(11)}$-estradiene-17β-ol Under an atmosphere of nitrogen, 1.570 gm. of 3,3-dimethoxy - 7α - methylΔ$^{5(10), 9(11)}$-estradiene-17-one (described in copending, commonly assigned U.S. application Ser. No. 576,240) were suspended in 24 cc. of methanol and 2.4 cc. of water and the reaction mixture was agitated. Without exceeding a temperature of 30° C., 0.8 gm. of sodium borohydride were slowly added thereto and then, still under an atmosphere of nitrogen, the mixture was agitated for 1 hour at room temperature. Next, 100 cc. of water were added and the reaction mixture was extracted with methylene chloride. The organic phases were washed with water, dried over sodium sulfate and distilled in dryness to obtain 1.620 gm. of 3,3-dimethoxy - 7α - methyl-Δ$^{5(10), 9(11)}$-estradiene-17β-ol which product was used as such in the next step of the synthesis.

The product is not described in the literature.

Step B: Preparation of 7α-methyl-17β-acetoxy-Δ$^{4,9}$-estradiene-3-one (a) Deketalization: 1.60 gm. of 3,3 - dimethoxy-7α-methyl-Δ$^{5(10), 9(11)}$-estradiene-17β-ol were dissolved in 32 cc. of a solution of 5 cc. of perchloric acid in a sufficient quantity of acetic acid to obtain 50 cc. of solution and the reaction mixture was agitated for 30 minutes at room temperature under an inert atmosphere. Then the reaction mixture was poured into 320 cc. of a saturated aqueous solution of sodium bicarbonate and extracted with methylene chloride. The organic phases were washed first with a saturated aqueous sodium bicarbonate solution, then with water and evaporated to dryness to obtain 1.560 gm. of raw 7α-methyl-Δ$^{4,9}$-estradiene-17β-ol-3-one.

This product was subjected to chromatography through silica gel, eluted with a benzene-ethyl acetate mixture (7:3) and then purified by recrystallization from an ethyl acetate-isopropyl ether mixture (6:4) to obtain 7α-methyl-Δ$^{4,9}$-estradiene-17β - ol - 3-one having a melting point of 171° C.

Ultra-violet spectra (in ethanol)

| | |
|---|---|
| λmax. | 218–219 mμ $E_{1cm}^{1\%}=198$ |
| inflection toward | 230 mμ $E_{1cm}^{1\%}=184$ |
| inflection toward | 237 mμ $E_{1cm}^{1\%}=175$ |
| λmax. | 307 mμ $E_{1cm}^{1\%}=686$ |

The product is not described in the literature.

(b) Acetylation: 1.545 gm. of raw 7α-methyl-Δ$^{4,9}$-estradiene-17β-ol-3-one were dissolved in 15.5 cc. of pyridine and 1.6 cc. of acetic anhydride and the mixture was agitated for 1 hour at a temperature of 60° C. Then, the reaction mixture was poured into 170 cc. of an ice water mixture and extracted with methylene chloride. The organic phases were washed first with hydrochloric acid, then with water, dried and evaporated to dryness to obtain 1.610 gm. of raw 7α-methyl-17β-acetoxy-Δ$^{4,9}$-estradiene-3-one which was purified by chromatography.

The purified product was eluted with a benzene-ethyl acetate mixture (9:1) and recrystallized from isopropyl ether to obtain 930 mg. of 7α-methyl-17β-acetoxy-Δ$^{4,9}$-estradiene-3-one having a melting point of 130° C.

*Analysis.*—$C_{21}H_{28}O_3$; molecular weight=328.43. Calculated (percent): C, 76.79; H, 8.59. Found (percent): C, 77.0; H, 8.7.

Ultra-violet spectra

| | | |
|---|---|---|
| λmax. | 217 mμ | $E_{1\,cm.}^{1\%}=181$ |
| inflection toward | 230 mμ | $E_{1\,cm.}^{1\%}=163$ |
| inflection toward | 238 mμ | $E_{1\,cm.}^{1\%}=151$ |
| λmax. | 304–305 mμ | $E_{1\,cm.}^{1\%}=621$ |

Infra-red spectra absence of OH
presence of acetate
presence of conjugated ketone This product is not described in the literature.

Using the procedure of Step B, 7α-methyl-13β-ethyl-$\Delta^{4,9}$-gonadiene-17β-ol-3-one was acetylated to obtain 7α-methyl-13β-ethyl-17β-acetoxy-$\Delta^{4,9}$-gonadiene-3-one having a melting point of 112° C. and a specific rotation $[\alpha]_D^{20} = -271°$ (c.=0.43% in chloroform).

This product is not described in the literature.

The latter starting material could be prepared from 7α-methyl-13β-ethyl-$\Delta^4$-gonene-17β-ol-3-one (described in U.S. Pat. No. 3,417,081) by ketalization to form the corresponding 3,3-dimethoxy derivative, oxalic acid hydrolysis of the ketal, bromination and dehydrobromination in the presence of pyridine to obtain the 7α-methyl-13β-ethyl-$\Delta^{4,9}$-gonadiene-17β-ol-3-one.

EXAMPLE II

Preparation of 7α,17α-dimethyl-$\Delta^{4,9}$-estradiene-17β-ol-3-one

Step A: Preparation of 3,3-dimethoxy-7α,17α-dimethyl-$\Delta^{5(10),\,9(11)}$-estradiene-17β-ol 1.732 gm. of 3,3-dimethoxy-7α-methyl-$\Delta^{5(10),\,9(11)}$-estradiene-17-one dissolved in 90 cc. of anhydrous benzene were added over a period of 20 minutes to 110 cc. of a titrating 2.3 M solution of methyl magnesium bromide in ether while cooling to maintain about 0° C. and the reaction mixture was agitated for a period of 20 hours at room temperature. Then, the reaction mixture was poured into a saturated aqueous solution of ammonium chloride, iced and decanted, then washed with water until the wash waters were neutral, dried and evaporated to dryness under vacuum to obtain 2.045 gm. of 3,3-dimethoxy-7α,17α-dimethyl-$\Delta^{5(10),\,9(11)}$-estradiene-17β-ol. The product was used as such for the following step of the synthesis.

Ultra-violet spectra (in ethanol)

λ max. 243 mμ ε=17.400

The product was insoluble in water and in dilute aqueous acids and alkalis and soluble in most of the usual organic solvents.

Step B: Preparation of 7α,17α-dimethyl-$\Delta^{4,9}$-estradiene-17β-ol-3-one 1.7 gm. of raw 3,3 - dimethoxy - 7α,17α - dimethyl-$\Delta^{5(10),9(11)}$-estradiene-17β-ol were dissolved in 17 cc. of acetic acid and after 1.7 cc. of 65% perchloric acid were added thereto, the mixture was agitated for 30 minutes at room temperature under an inert atmosphere. Then, the reaction mixture obtained was poured into an ice-water mixture, agitated for 15 minutes, vacuum filtered, washed and then dried under vacuum. The product obtained was chromatographed through silica gel with elution with a benzene-ethyl acetate mixture (1:1) and then purified by recrystallization from acetone under reflux to obtain 502 mg. of 7α,17α-dimethyl-$\Delta^{4,9}$-estradiene-17β-ol-3-one having a melting point of 210° C. and a specific rotation of $[\alpha]_D^{20} = -330°$ (c.=0.51% in chloroform).

*Analysis.*—$C_{20}H_{28}O_2$; molecular weight=300.43. Calculated (percent): C, 79.96; H, 9.38. Found (percent): C, 80.3; H, 9.6.

Ultra-violet spectra (in ethanol)

| | | |
|---|---|---|
| λmax. | 219 mμ | $E_{1\,cm.}^{1\%}=191$ |
| inflection toward | 230–231 mμ | $E_{1\,cm.}^{1\%}=178$ |
| inflection toward | 238–239 mμ | $E_{1\,cm.}^{1\%}=170$ |
| λmax. | 306–307 mμ | $E_{1\,cm.}^{1\%}=667$ |

The product occurred in the form of white prisms which were insoluble in water, in dilute aqueous acids and alkalis and in benzene, slightly soluble in ether and soluble in alcohol and chloroform.

This product is not described in the literature.

EXAMPLE III

Preparation of 7α-methyl-17α-ethynyl-$\Delta^{4,9}$-estradiene-17β-ol-3-one

Step A: Preparation of 3,3-dimethoxy-7α-methyl-17α-ethynyl-$\Delta^{5(10),9(11)}$-estradiene-17β-ol 105 cc. of ammonia were cooled to —50° C. and after 1.750 gm. of potassium were added under agitation and with a current of inert gas, a stream of acetylene was passed through the mixture for 30 minutes. The precipitate obtained was diluted with 28 cc. of ether and then, 28 cc. of ether and 7 gm. of 3,3-dimethoxy-7α-methyl-$\Delta^{5(10),9(11)}$-estradiene-17-one were added while maintaining the temperature at —50° C. and continuing the agitation and the stream of inert gas. The reaction mixture was then agitated for 4 hours at —40° C. with a current of acetylene. Thereafter, 3.5 gm. of ammonium chloride were introduced, the temperature was raised to 0° C. and the ammonia was removed. 30 cc. of water were added to the reaction mixture which was then extracted with methylene chloride. The organic phase was washed with water until the wash waters were neutral, then dried, filtered and evaporated to dryness to obtain 7.7 gm. of raw 3,3-dimethoxy-7α-methyl-17α-ethynyl-$\Delta^{5(10),9(11)}$ - estradiene-17β-ol, which was purified by chromatography through magnesium silicate and subsequent recrystallization from isopropyl ether to obtain 5.2 gm. (69% yield) of 3,3-dimethoxy - 7α - methyl - 17α - ethynyl - $\Delta^{5(10),9(11)}$-estradiene-17β-ol in the form of a solid, colorless product having a melting point of about 130° C. and which was soluble in the usual organic solvents and insoluble in water and in dilute aqueous acids and alkalis.

Infra-red spectra absence of C=O
presence of OH at 3,590 cm.$^{-1}$
presence of C≡CH at 3,300 cm.$^{-1}$
presence of two bands of the conjugated C=C type at 1,643 cm.$^{-1}$ and 1,612 cm.$^{-1}$ Step B: Preparation of 7α-methyl-17α-ethynyl-$\Delta^{4,9}$-estradiene-17β-ol-3-ol 3.3 gm. of raw 3,3-dimethoxy-7α-methyl-17α-ethynyl-$\Delta^{5(10),9(11)}$-estradiene-17β-ol were dissolved in 33 cc. of acetic acid and after 3.3 cc. of 65% perchloric acid were added thereto, the mixture was agitated for 30 minutes at room temperature under an inert atmosphere. Then, the reaction mixture was poured into an ice water mixture, agitated for 15 minutes, vacuum filtered, washed and dried under vacuum. The product obtained was chromatographed through silica gel with elution with a benzene-ethyl acetate mixture (1:1) and purified by recrystallization from benzene to obtain 1.460 gm. of 7α-methyl-17α-ethynyl-$\Delta^{4,9}$- estradiene-17β-ol-3-one having a melting point of 204° C. and a specific rotation of $[\alpha]_D^{20} = -346°$ (c.=0.53% in chloroform).

Analysis.—$C_{21}H_{26}O_2$; nuclear weight=310.45. Calculated (percent): C, 81.25; H, 8.44. Found (percent): C, 81.2; H, 8.7.

Ultra-violet spectra (in ethanol)

| | | |
|---|---|---|
| λmax. | 219 mμ | $E_{1\,cm.}^{1\%}$=186 |
| inflection toward | 230 mμ | $E_{1\,cm.}^{1\%}$=170 |
| λmax. | 306 mμ | $E_{1\,cm.}^{1\%}$=640 |

Infra-red spectra (in chloroform)

presence of OH at 3,600 cm.$^{-1}$
presence of C≡CH at 3,300 cm.$^{-1}$

The product occurred in the form of white platelets which were insoluble in water and in dilute aqueous acids and alkalis, very slightly soluble in ether, slightly soluble in acetone and benzene and soluble in alcohol and chloroform.

This product is not described in the literature.

EXAMPLE IV

Preparation of the hexahydrobenzyl carbonate of 7α-methyl-Δ$^{4,9}$-estradiene-17β-ol-3-one 0.650 gm. of raw 7α-methyl-Δ$^{4,9}$-estradiene-17β-ol-3-one, obtained as described in Step B of Example I, were dissolved in 33 cc. of pyridine under agitation and an inert atmosphere, and 1.35 cc. of hexahydrobenzyl chloroformate (described in copending, commonly assigned U.S. patent application Ser. No. 391,120) were added thereto. The agitation was continued for 2 hours and then the reaction mixture was cooled at 0° C. and neutralized with 1.25 cc. of triethylamine. Next, the reaction mixture was poured into ice water and extracted with methylene chloride. The organic extract was washed with water, dried over sodium sulfate and evaporated to dryness. The raw product thus obtained was subjected to chromatography through silica gel with elution with benzene-ethyl acetate mixture (9:1) and then was purified by recrystallization from isopropyl ether to obtain 0.5 gm. of the hexahydrobenzyl carbonate of 7α-methyl-Δ$^{4,9}$-estradiene-17β-ol-3-one having a melting point of 104° C. The product obtained was soluble in ethanol, chloroform, ethyl acetate and benzene and slightly soluble in ether and isopropyl ether.

Analysis.—$C_{27}H_{38}O_4$; molecular weight=426.57. Calculated (percent): C, 76.02; H, 8.98. Found (percent): C, 75.6–75.7; H, 9.0–9.1.

This compound is not described in the literature.

EXAMPLE V

Preparation of 7α-methyl-17β-allyloxy-Δ$^{4,9}$-estradiene-3-one

Step A: Preperation of 3,3-dimethoxy-7α-methyl-17β-allyloxy-Δ$^{5(10),9(11)}$-estradiene Under an atmosphere of nitrogen, first 1.5 gm. of 3,3-dimethoxy-7α-methyl-Δ$^{5(10),9(11)}$-estradiene - 17β - ol (obtained in Step A of Example I), then 0.427 gm. of a suspension of sodium hydride in paraffin oil (content=55% NaH) were introduced into 17 cc. of tetrahydrofuran. The mixture was agitated for 30 minutes at about 40° C., and 5.3 gm. of allyl bromide were added thereto. Then, the reaction solution was agitated for 20 hours at 40° C., cooled and poured into a saturated aqueous solution of sodium bicarbonate. The aqueous phase was extracted with methylene chloride and the extracts were combined. The obtained organic solution was washed with water, dried over sodium sulfate and finally concentrated to dryness under reduced pressure. The residue thus obtained was subjected to chromatography through silica gel and then was crystallized from ethanol containing 1% of triethylamine to obtain 0.910 gm. of 3,3-dimethoxy-7α-methyl-17β-allyloxy-Δ$^{5(10),9(11)}$-estradiene.

This compound is not described in the literature.

Step B: Preparation of 7α-methyl-17β-allyloxy-Δ$^{4,9}$-estradiene-3-one 0.9 gm. of 3,3-dimethoxy - 7α - methyl - 17β - allyloxy-Δ$^{5(10),9(11)}$-estradiene were dissolved in 18 cc. of a solution of 5 cc. of perchloric acid in a sufficient quantity of acetic acid to obtain 50 cc. of solution and the reaction mixture was agitated for 30 minutes at room temperature under an inert atmosphere. Thereafter, the reaction mixture was poured into 160 cc. of a saturated aqueous solution of sodium bicarbonate and extracted with methylene chloride. The organic phase was washed first with a solution of sodium bicarbonate, then with water, dried and evaporated to dryness to obtain 0.6 gm. of 7α-methyl-17β-allyloxy-Δ$^{4,9}$-estradiene-3-one.

This compound is no described in the literature.

PHARMACOLOGICAL STUDY (A) Determination of the anabolic and androgenic activity of 7α-methyl-17β-acetoxy-Δ$^{4,9}$-estradiene-3-one 7α-methyl-17β-acetoxy-Δ$^{4,9}$-estradiene-3-one, utilized as a solution in olive oil admixed with 5% benzylic alcohol, was administered subcutaneously, at daily doses of $$10\gamma \times \frac{10}{9} \text{ and } 100\gamma \times \frac{10}{9}$$

or at total doses of 100γ and 1000γ divided into 9 administrations over a period of 10 days. Table III summarizes the obtained results.

TABLE III

| Groups | Daily dose | Weight of the animals Initial | Weight of the animals Final | Fresh kidneys, mg. | Fresh kidneys, gm. per 1,000 g. of rat | Dry kidneys, mg. | Dry kidneys, gm. per 1,000 g. of rat | Fresh levator ani, mg. | Fresh levator ani, gm. per 1,000 g. of rat | Dry levator ani, mg. | Dry levator ani, gm. per 1,000 g. of rat | Seminal vesicles, mg. | Prostate gland, mg. |
|---|---|---|---|---|---|---|---|---|---|---|---|---|---|
| Controls | 0 | 54 | 97 | 412.4 | 4.252 | 80.6 | 0.831 | 21.1 | 0.218 | 5.0 | 0.052 | 5.5 | 10.6 |
| 7α-methyl-17β-acetoxy-Δ$^{4,9}$-estradiene-3-one. | $\frac{10\gamma \times 10}{9}$ | 53 | 89 | 430.3 | 4.835 | 91.6 | 1.029 | 61.0 | 0.685 | 11.8 | 0.151 | 149.8 | 120.8 |
| | $\frac{100\gamma \times 10}{9}$ | 52 | 85 | 440.4 | 5.181 | 92.8 | 1.092 | 70.5 | 0.829 | 14.2 | 0.167 | 309.1 | 196.6 |

The results of the above table show that 7α-methyl-17β-acetoxy-Δ$^{4,9}$-estradiene-3-one exerts distinct anabolic and androgenic activity beginning with the dose of 10γ, administered subcutaneously, and becomes extremely intense at the dose of 100γ per day.

(B) Using the same procedure, the anabolic and androgenic activity of 7α-methyl-13β-ethyl-17β-acetoxy-Δ$^{4,9}$-gonadiene-3-one was determined and the results are reported in Table IV.

TABLE IV

7α-methyl-13β-ethyl-17β-acetoxy-Δ$^{4,9}$-gonadiene-3-one

| Administered dose, γ | Levator ani, mg. | Seminal vesicules, mg. | Prostate, mg. |
|---|---|---|---|
| 0 | 22.1 | 6.8 | 8.4 |
| 2 | 39.7 | 11.6 | 23.0 |
| 10 | 64.0 | 49.0 | 77.4 |
| 50 | 75.7 | 237.2 | 158.8 |

Table IV shows that 7α-methyl-13β-ethyl-17β-acetoxy-Δ$^{4,9}$-gonadiene-3-one possesses an extremely high anabolic activity whereas the androgenic activity is moderate both on the prostate as well as on the seminal vesicules at overage doses. In contrast thereto, the androgenic activity of the 13β-methyl derivative as shown in Table III is sensibly attenuated. This is shown by a comparison of the seminal vesicules and prostate weight at the 10γ dosage in Tables III and IV.

(C) The anabolic and androgenic activity of 7α-methyl-17β-hexahydrobenzyloxycarbonyloxy - $\Delta^{4,9}$ - estradiene-3-one was compared to the hexahydrobenzyloxycarbonyloxy ester of testosterone using the procedure of Sakamoto et al. (Proc. Soc. exp. biol. Med., Vol. 76 (1951), page 406). Male rats four and a half weeks old and weighing about 50 gm. were castrated and 3 weeks later the rats received a single subcutaneous injection of the product and were sacrificed on one of following dates: 10, 24 and 38 days after the injection. The animals were then autopsied and the following interesting organs were examined to establish the androgenic and anabolic activity: levator ani, seminal vesicules and prostate. 7α-methyl-17β-hexahydrobenzyloxycarbonyloxy-$\Delta^{4,9}$-estradiene-3-one was used as a solution in olive oil containing 5% benzyl alcohol and the single injection was a dose of 10 mg. per animal. Hexahydrobenzyloxycarbonyloxy testosterone was administered in the same way at a dose of 13 mg. per animal. The results are shown in Table V.

TABLE V

| Day after treatment | Groups | Fresh levator ani, mg. | Seminal vesicules, mg. | Prostate, mg. |
| --- | --- | --- | --- | --- |
| 10 | Controls | 40.2 | 7.5 | 11.2 |
| | 7α-methyl-17β-hexahydrobenzyloxy carbonyloxy-$\Delta^{4,9}$-estradiene-3-one. | 125.9 | 367.5 | 136.8 |
| | Hexahydrobenzyloxy-carbonyloxy testosterone. | 98.6 | 318 | 198 |
| 24 | Controls | 39.5 | 10.9 | 30.1 |
| | 7α-methyl-17β-hexahydrobenzyloxy carbonyloxy-$\Delta^{4,9}$-estradiene-3-one. | 149.3 | 568.4 | 280.6 |
| | Hexahydrobenzyl-carbonyloxy testosterone. | 186 | 679 | 433 |
| 38 | Controls | 38.4 | 9.5 | 18.3 |
| | 7α-methy-17β-hexahydrobenzyloxy carbonyloxy-$\Delta^{4,9}$-estradiene-3-one. | 113.1 | 532.5 | 411.0 |
| | Hexahydrobenzyloxy carbonyloxy testosterone. | 170 | 143 | 254 |

The results of Table V show that 7α-methyl-17β-hexahydrobenzyloxycarbonyl-$\Delta^{4,9}$-estradiene-3-one exercises a slower and more prolonged androgenic activity than the same ester of testosterone even though the former was administered a slightly weaker dose.

Various modifications of the process and composition of the invention may be made without departing from the spirit or scope thereof.

We claim:
1. The hexahydrobenzyl carbonate of 7α-methyl-$\Delta^{4,9}$-estradiene-17β-ol-3-one.
2. 7α-methyl-17β-allyloxy-$\Delta^{4,9}$-estradiene-3-one.

3. A process for the preparation of a 7α-methyl-$\Delta^{4,9}$-gonadiene-3-one of the formula

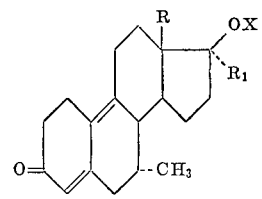

wherein R is an alkyl of 1 to 4 carbon atoms and $R_1$ is selected from the group consisting of hydrogen and saturated and unsaturated hydrocarbon which may be substituted and X is lower alkenyl comprising subjecting a 3-ketal - 7α - methyl-13β-R-$\Delta^{5(10),9(11)}$-gonadiene-17-one wherein R is alkyl of 1 to 4 carbon atoms to the action of a reducing agent to form the corresponding 3-ketal-7α-methyl - 13β - R-17α-$R_1$-$\Delta^{5(10),9(11)}$-gonadiene - 17β - ol wherein $R_1$ and R have the above definition, reacting the latter with a lower alkenyl halide in the presence of an acid acceptor to form the corresponding 3-ketal-7α-methyl-13β-R-17α-$R_1$-17β-lower alkenyloxy-$\Delta^{5(10),9(11)}$-gonadiene and reacting the latter with a strong mineral acid to form the corresponding 7α-methyl - 13β - R-17α-$R_1$-17β-lower alkenyloxy-$\Delta^{4,9}$-gona-diene-3-one.

4. A process for the production of the compound of claim 1 which comprises reducing 3,3-dilower alkoxy-7α-methyl-$\Delta^{5(10),9(11)}$-estradiene-17-one with an alkali metal borohydride to form 3,3-dimethoxy-7α-methyl-$\Delta^{5(10),9(11)}$-estradiene-17β-ol, treating the latter under acidic conditions to form 7α-methyl-$\Delta^{4,9}$-estradiene-17β-ol-3-one, reacting the latter with hexahydrobenzyl haloformate in the presence of a tertiary base to obtain the compound of claim 1.

5. A process for the preparation of 7α-methyl-13β-ethyl-17β-OX-$\Delta^{4,9}$-gonadiene-3-one wherein X is an acyl of an organic carboxylic acid of 1 to 18 carbon atoms which comprises ketalizing 7α-methyl-13β-ethyl-$\Delta^4$-gonene-17β-ol-3-one with an alkanol in the presence of hydrochloric acid, hydrolyzing by means of oxalic acid 3,3-dialokoxy-7α-methyl-13β-ethyl-$\Delta^{5(10)}$-gonene - 17β - ol to form 7-α-methyl-13β-ethyl-$\Delta^{5(10)}$-gonene-17β-ol-3-one, brominating and dehydrobrominating the latter in the presence of pyridine to obtain the 7α-methyl-13β-ethyl-$\Delta^{4,9}$-gonadiene-17β-ol-3-one which is acylated by means of functional derivative of an organic carboxylic acid of 1 to 18 carbon atoms to the corresponding 17β-acyloxy compound.

References Cited

UNITED STATES PATENTS 3,086,027  4/1963  Perelman et al. _____ 260—397.3
3,385,872  5/1968  Alvarez _____ 260—397.45
3,413,314  11/1968  Amiard et al. _____ 260—343.2

OTHER REFERENCES

Brown et al., Steroids, vol. 1, p. 114 (1963).
Campbell et al., Steroids, vol. 1, pp. 317–22 (1963).

HENRY A. FRENCH, Primary Examiner

U.S. Cl. X.R.

260—239.55 R, 397.5; 424—243